United States Patent Office 3,148,068
Patented Sept. 8, 1964

3,148,068
ANIMAL FEEDS CONTAINING TRIAZOLES
Robert Glenn Eggert, Washington Crossing, Pa., and William Thomas Akers, Statesboro, Ga., assignors to American Cyanamid Company, Stamford, Conn., a corporation of Maine
No Drawing. Filed Apr. 17, 1962, Ser. No. 188,280
9 Claims. (Cl. 99—2)

This invention relates to an animal feed or animal feed additive containing specified C-monosubstituted triazoles and more particularly relates to ruminant feed additives.

The feeding of fattening cattle presents an economic problem of obtaining a maximum gain in weight of these meat animals with a minimum consumption of feed. A number of additives have been used for animal feeds, some of them being antibiotics which apparently function by reason of keeping the animal more healthy and certain female sex hormones or compounds having similar activity, such as diethyl-stilbestrol.

The present invention depends on a surprising discovery that a class of compounds, toxic to weeds, namely, certain C-monosubstituted 1,2,4-triazoles, are not only non-toxic to ruminants in small amounts but produce a marked increase in growth in these animals. The triazoles may be used as the only additive or they may be combined with a female sex hormone-like compound, such as diethyl-stilbestrol, which further enhances the growth of fattening cattle. It is a further advantage that the triazoles of the present invention are compatible with diethyl-stilbestrol and so it is possible to prepare animal feeds containing both. This greatly extends the field of utility of the present invention.

The growth promoting action of the present invention depends on the triazole being mono-C-substituted. When di-C-substituted compounds are used, they either have no activity or so little as not to be practically useful. It should be understood that when mono-substitution is referred to, it means that only a single radical is attached. It does not means that this necessarily has to be through a single valence bond, as compounds in which the substituting radical is linked to the triazole through an aldehyde amine type linkage are also active.

Among the triazoles which are most effective is ordinary 3-amino-1,2,4-triazole, which is one of the best; 3-alkanoylaminotriazoles, such as 3-acetylamino, 3-propionylamino, 3-butyrylamino, etc.; and 3-furfurylideneamino-1,2,4-triazole and the like.

It is not intended to limit the invention to any theory of why these highly toxic materials do not have adverse effects and do have beneficial growth effects when added to the feed of fattening cattle.

It has been found that these beneficial growth promoting effects can be accomplished in fattening cattle when as little as 5 mg. per pound of total feed, and as much as 120 mg. per pound of feed are used. However, we prefer to add about 10 to about 40 mg. of the mono-C-substituted amino-triazole per pound of total feed, to obtain results.

It is also an advantage of the invention that the method of feeding the compositions are not critical. A very satisfactory method is to admix with the feed small amounts of the additive so that when the animal eats the feed, the desired quantity is obtained each day. However, it is not necessary to use this method and more concentrated food may be given so that a single daily feeding of less than a day's consumption of feed will introduce the desired amount of triazole. Another method is to prepare protein supplements, which contain sufficient triazole so that when mixed with the rest of the feed, the requisite amounts are ingested by the animal. The triazole can also be added by means of a compatible concentrate of a solid or liquid diluent. Water is a good liquid diluent. A portion of the feed may be used as a solid diluent which is subsequently admixed with the total feed. Any of these methods are satisfactory, however, we prefer to incorporate the triazole with the total feed or as a concentrate to be mixed with the total feed so that all the animals feeding are assured of an equal dosage.

Another advantage of the present invention is that the aminotriazoles do not adversely affect the palatability of the feed and particularly in the case of ruminants, the feed containing the triazoles is palatable and the animal consumes the feed readily. This is manifest in that there is no reduction of feed intake by the animal when consuming the triazole-treated feed of this invention.

The invention will be described in greater detail in conjunction with the following specific examples which give typical feeds.

EXAMPLE 1

Feed was prepared as follows:

Table

| | Percentage |
|---|---|
| Coarse cracked corn | 66.8 |
| Crimped oats | 15.0 |
| Soybean oil meal | 6.0 |
| Blackstrap molasses | 4.0 |
| Dehydrated alfalfa meal | 5.0 |
| Ground limestone | 1.0 |
| Steamed bonemeal | 1.0 |
| Iodized salt | 1.0 |
| Trace mineral mix [1] | 0.1 |
| Vitamin A and D mix [2] | 0.1 |
| Total | 100.0 |

[1] Furnished the following amounts of trace minerals in the ration: manganese, 60 p.p.m.; iron, 20 p.p.m.; iodine, 1.2 p.p.m.; copper 2 p.p.m.; zinc, .06 p.p.m.; and cobalt, .2 p.p.m.
[2] Furnished 4,500 I.U. of vitamin A and 900 I.U. of vitamin D per pound of ration.

The food was divided into three lots, to one of which nothing is added, to one 20 milligrams of 3-amino-1,2,4-triazole compound and to a third 40 milligrams of 3-amino-1,2,4-triazole per pound of feed.

Steers were fed for 56 days on the above feeds, the average ingestion being 15 pounds per day. This was supplemented with timothy-alfalfa hay which was given ad libitum.

The effects of the feedings are shown in the following table:

Table

| | Milligrams of 3-Amino-triazole per pound of feed | | |
|---|---|---|---|
| | 0 | 20 mg. | 40 mg. |
| Av. Initial Weight | 762 | 750 | 793 |
| Av. Final Weight | 877 | 907 | 960 |
| Av. Daily Gain | 2.07 | 2.80 | 2.98 |

It will be apparent that at the 20 milligram per pound of feed, the gain was 35% and at 40 milligrams per pound of feed was about 44% over that obtained with the basal ration.

EXAMPLE 2

Another experiment was conducted in which the 3-amino-1,2,4-triazole was added to the protein supplement in such amounts as to give an average intake of 250, 500, 1,000 and 2,000 milligrams of the 3-amino-1,2,4-triazole per steer per day. This protein supplement was blended with the remainder of the ration to produce total feeds containing about 10, 20, 40 and 80 mg. of triazole per pound of total feed. The average weight of these steers was approximately 800 pounds when the experiment was started. The following table shows the results of the test:

*Table*

AVERAGE GROWTH AND FEED EFFICIENCY DATA FOR STEERS RECEIVING FOUR LEVELS OF 3-AMINO-1,2,4-TRIAZOLE FOR 56 DAYS

|  | Milligrams of 3-amino-1,2,4-triazole per pound of total feed | | | | |
| --- | --- | --- | --- | --- | --- |
|  | Basal | 10 | 20 | 40 | 80 |
| Number of Steers | 20 | 20 | 20 | 20 | 20 |
| Average Daily Gain (Pounds) | 2.93 | 3.34 | 3.37 | 3.60 | 3.71 |
| Pounds of Feed/Pound of Gain | 7.37 | 6.56 | 6.40 | 5.76 | 5.30 |

EXAMPLE 3

The procedure of Examples 1 and 2 were repeated replacing the 3-amino-1,2,4-triazole with a stoichiometrical equivalent of 3-acetylamino-1,2,4-triazole. The gains in weight were substantially similar to those of Examples 1 and 2.

EXAMPLE 4

The procedure of Examples 1 and 2 were repeated replacing the 3-amino-1,2,4-triazole with a stoichiometrical equivalent of 3-furfurylideneamino-1,2,4-triazole. The gains in weight were substantially similar to those of Examples 1 and 2.

This application is a continuation-in-part of our application Serial No. 837,355, filed September 1, 1959, now abandoned.

We claim:

1. A ruminant feed containing from about 5 mg. to 120 mg. of a mono-C-substituted triazole per pound of total ruminant feed, the triazole being selected from the group consisting of 3-amino-1,2,4-triazole, 3-lower-alkanoylamino-1,2,4-triazoles, and 3-furfurylideneamino-1,2,4-triazole.

2. A feed according to claim 1 in which the triazole is 3-amino-1,2,4-triazole.

3. A feed according to claim 1 in which the triazole is 3-lower-alkanoylamino-1,2,4-triazole.

4. A feed according to claim 3 in which the lower alkanoylamino is acetylamino.

5. A feed according to claim 1 in which the triazole is 3-furfurylideneamino-1,2,4-triazole.

6. A feed according to claim 1 containing from about 10 to 40 mg. of the triazole per pound of total feed.

7. A method for accelerating the growth of ruminant animals which comprises feeding said animals a total ruminant feed containing from about 5 mg. to 120 mg. of a mono-C-substituted triazole per pound of total feed, the triazole being selected from the group consisting of 3-amino-1,2,4-triazole, 3-lower-alkanoylamino-1,2,4-triazoles, and 3-furfurylideneamino-1,2,4-triazole.

8. A method according to claim 7 in which the triazole is 3-amino-1,2,4-triazole.

9. A method according to claim 8 in which the ruminant feed contains from about 10 to about 40 mg. of the triazole per pound of total feed.

References Cited in the file of this patent

Rowe et al.: American Jr. of Veterinary Research, vol. 15, October 1954, pp. 622–7.

Hanna: Handbook of Agricultural Chemicals, 2nd Ed., 1958, pp. 210–24, published by L. W. Hanna, Rt. 1, Box 210, Forest Grove, Oreg.